No. 805,908. PATENTED NOV. 28, 1905.
J. W. GILLELAND.
COTTON CUPPER OR SPACER.
APPLICATION FILED MAY 2, 1905.
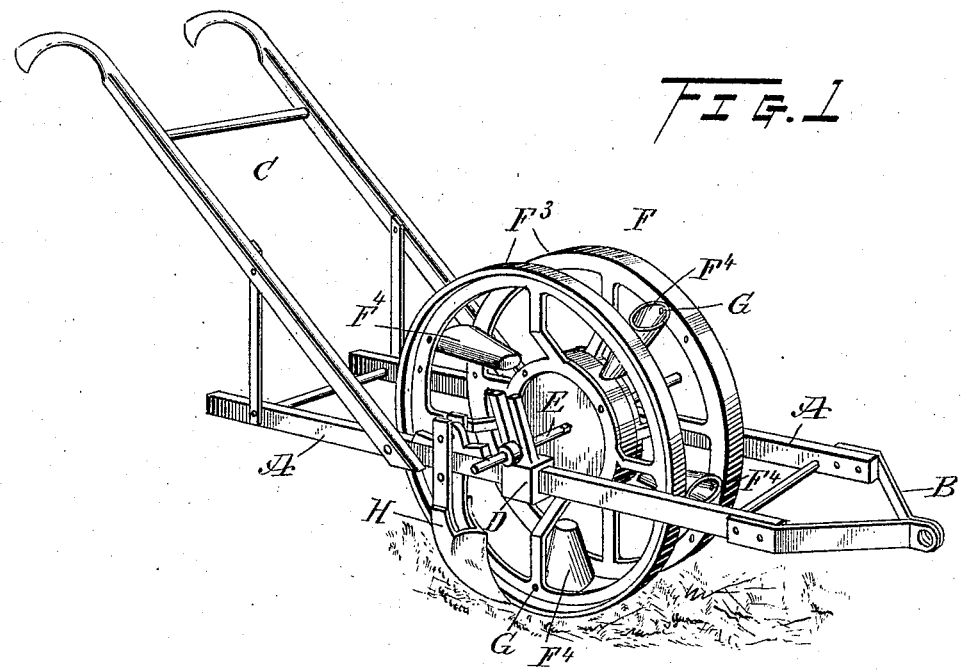
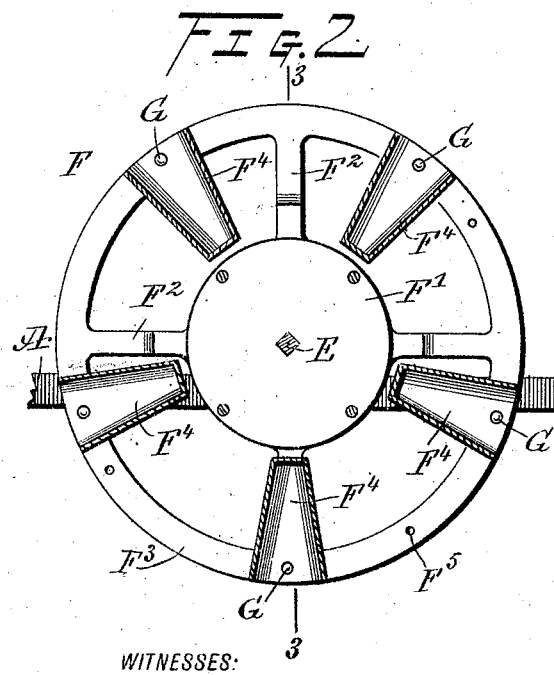
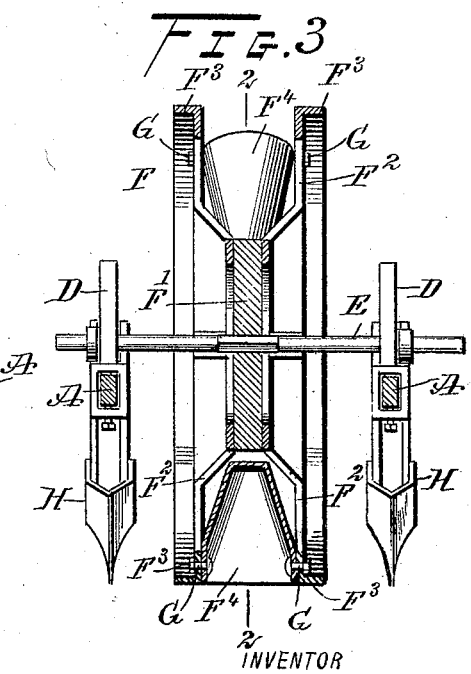
WITNESSES:
John J. Kiele
Geo. J. Hoster
INVENTOR
John Wesley Gilleland
BY
Muunk
ATTORNEYS

UNITED STATES PATENT OFFICE.

JOHN WESLEY GILLELAND, OF ATHENS, GEORGIA, ASSIGNOR OF ONE-HALF TO PERCY LAMAR HUGGINS, OF ATHENS, GEORGIA.

COTTON CUPPER OR SPACER.

No. 805,908.  Specification of Letters Patent.  Patented Nov. 28, 1905.

Application filed May 2, 1905. Serial No. 258,487.

*To all whom it may concern:*

Be it known that I, JOHN WESLEY GILLELAND, a citizen of the United States, and a resident of Athens, in the county of Clarke and State of Georgia, have invented a new and Improved Cotton Cupper or Spacer, of which the following is a full, clear, and exact description.

The invention relates to agricultural machines; and its object is to provide a new and improved cotton cupper or spacer designed to cup or protect the stand during the operation of cultivating and spacing the plants by covering up and arranged to leave the cotton-plants in a properly-cultivated state.

The invention consists of novel features and parts and combinations of the same, as will be more fully described hereinafter and then pointed out in the claim.

A practical embodiment of the invention is represented in the accompanying drawings, forming a part of this specification, in which similar characters of reference indicate corresponding parts in all the views.

Figure 1 is a perspective view of the improvement. Fig. 2 is an enlarged sectional side elevation of the improvement on the line 2 2 of Fig. 3, and Fig. 3 is a transverse section of the same on the line 3 3 of Fig. 2.

A double plow stock or frame A is provided at its forward end with the usual draft-arm B and at the rear end with the handle C, adapted to be taken hold of by the operator to guide the cotton cupper or spacer over the field. On the side arms of the frame A are secured bearings D, in which is journaled the transversely-extending shaft E of the cupper-wheel F, consisting, essentially, of a hub F', secured to the said shaft E, and from opposite sides of the said hub F' extend sets of spokes $F^2$, integrally connected at their outer ends with spaced rims $F^3$, between which are arranged cups $F^4$, disposed radially and secured at opposite sides by bolts G to the rims $F^3$. Any desired number of cups $F^4$ may be employed, according to the distance to the left between the adjacent cotton-plants, and in order to allow the use of more or less cups $F^4$ than shown in the drawings extra apertures $F^5$ are formed in the rims $F^3$ to allow the securing of six or less cups $F^4$ to the rims $F^3$ by the use of additional bolts G.

The cups $F^4$ are preferably made elliptical in cross-section, the major axis of the ellipse extending transversely to the direction of the travel of the cupping-wheel F. The outer or open ends of the cups $F^4$ are approximately flush with the peripheral faces of the rims $F^3$, so that when the machine is drawn over the field it is evident that the cupping-wheel F is rotated by the rims $F^3$ traveling on the ground, and as the rims $F^3$ carry the cups $F^4$ the latter cup or protect cotton-plants in the row at proper distances apart and without danger of such protected or cupped plants being injured by the cultivating and covering-up action of the cultivating-plows H of any approved construction and secured to the side beams of the plow-frame A.

As shown in the drawings, the cultivating-plows H are of the usual construction and are preferably adjustably secured to the side beams of the plow-frame A immediately in the rear of the bearings D.

By having the cupping-wheel F provided with the spaced rims $F^3$ and the cups $F^4$ located between the said spaced rims it is evident that sidewise movement of the machine is prevented and a proper cupping or covering of the plant takes place by the cups $F^4$ to prevent injury to the plants and to allow the cultivating-plows H to properly cultivate the ground and cover up the plants not cupped or protected by the cups $F^4$.

The machine is very simple and durable in construction, is composed of comparatively few parts, and is not liable to get easily out of order.

Having thus described my invention, I claim as new and desire to secure by Letters Patent—

A cotton-cupper comprising a frame, bearings on the frame, a shaft journaled in the bearings, a hub on the shaft, rings secured to either side of the hub, integral spokes on the rings and comprising a portion bent outwardly from the rings, a portion parallel with the rings, rims connected with the parallel portions, elliptical cups between the rims, the major axis of the cups being transverse to the rings, and bolts for securing the cups to the rings.

In testimony whereof I have signed my name to this specification in the presence of two subscribing witnesses.

JOHN WESLEY GILLELAND.

Witnesses:
F. L. BRAMBLETT,
W. A. E. CHURCH.